March 11, 1958     R. W. STRACHAN     2,826,727
MOTOR STARTING RELAY
Filed March 29, 1956
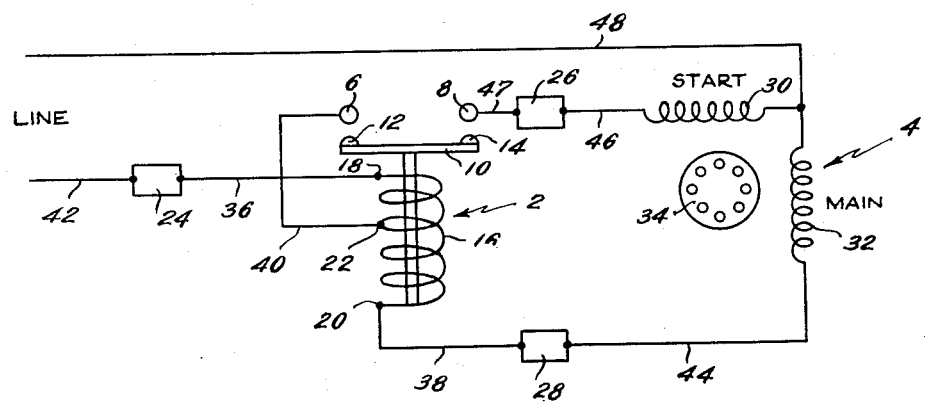
INVENTOR.
*Richard W. Strachan,*
BY
William W. Sollow Jr.
*Atty.*

United States Patent Office 2,826,727
Patented Mar. 11, 1958

2,826,727

MOTOR STARTING RELAY

Richard W. Strachan, Providence, R. I., assignor to Metals & Controls Corporation, Attleboro, Mass., a corporation of Massachusetts Application March 29, 1956, Serial No. 574,784

2 Claims. (Cl. 318—221)

This invention relates to an electrical system including electromagnetic relay and an electrical motor having a main winding and a starting winding.

An object of the invention is the provision of such a system which will enable the starting of a motor of the aforesaid class with a minimum of irregular operations of the relay.

Another object of the invention is provision of such a system by which a first portion of the coil of the relay serves to connect the starting winding of the motor to a power source, and by which another portion of said relay, along with said first portion, serves to connect the main winding of the motor to the power source.

Another object of the invention is the provision of such a system by which the electrical circuit electrically connecting the starting winding to a power source is automatically opened when the rotor of the motor reaches the proper rotational speed.

Another object of the invention is the provision of such a system whereby the electrical current through the starting winding of the motor aids the electrical current through the main winding of the motor in tending to maintain the relay contacts in closed position.

Another object of the invention is the provision of such a system which is simple to construct and satisfactory in operation.

Other objects and advantages of the invention will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, the figure is a more or less diagrammatic view showing an electrical system embodying this invention.

In the use of motors having a starting winding and a main winding which are customarily operated by means of a so-called motor starting relay and in which the relay serves to connect the starting winding to the power source momentarily until the motor comes up to its proper running speed, difficulty is sometimes found in matching the "pull-in" current and the "drop-out" current to the motor characteristics. By "pull-in" current is meant that current flowing through the main winding of the motor which causes the relay contacts to close thereby to connect the starting winding to the power source. By "drop-out" current is meant that current flowing through the main winding which permits the relay contacts to open thereby to disconnect the starting winding from the power source.

Another trouble sometimes encountered is that, for some unknown reason, the inherent characteristics of the relay (such as its electromagnetic field, the spring forces associated with the relay armature, etc.) are so related to the electrical characteristics of the motor that the relay contacts intermittently open and close while the starting winding is connected to the power source instead of remaining firmly closed. The present invention overcomes both of these difficulties.

Referring to the figure, which shows a single embodiment of the invention, the power source is indicated by the word "Line" in the drawing, the relay of this invention is indicated generically by numeral 2, and the motor is indicated generically by the numeral 4. Relay 2 includes a pair of stationary contacts 6 and 8, which may be electrically connected and disconnected by a contact-carrying or bridging means provided by an armature 10. This bridging means carries movable contacts 12 and 14 for cooperation with contacts 6 and 8, respectively. Relay 2 further includes a relay coil 16 which is provided with end connections 18 and 20 and a tapped turn 22. Terminals 24, 26, and 28 are likewise provided for connections which will be described later.

The motor 4 is provided with the starting winding 30, the main winding 32, and the rotor 34. Electrical connections are made as follows: Wire 36 connects terminal 24 with end 18, wire 38 connects terminal 28 with end 20 and wire 40 connects tapped turn 22 with contact 6. It is to be noticed that these are internal connections of the relay.

The relay is electrically connected to the motor and the power source as follows: Wire 42 connects one side of the power source to terminal 24, wire 44 connects terminal 28 to one end of the main winding 32, wire 46 connects one end of the starting winding to terminal 26 and wire 47 connects terminal 26 to contact 8. Finally, wire 48 connects the respective other ends of the starting and main windings to the other side of the power source.

The operation of the device is as follows: With the relay contacts in the open position as shown, the current flows from the power source through wire 42, terminal 24, wire 36, relay coil 16, wire 38, terminal 28, wire 44, main winding 32, and back to the power source through wire 48. The main winding current flowing through coil 16 causes the contact-carrying member provided by armature 10 to move up until contacts 6 and 8 engage contacts 12 and 14, respectively, thus completing a circuit across contacts 6 and 8. Current now flows to the starting winding via wire 42, terminal 24, wire 36, the portion of relay coil 16 consisting of those turns which lie between the tapped turn 22 and the end 18 of the relay coil, wire 40, contacts 6 and 12, the contact arm provided by armature 10, contacts 14 and 8, wire 47, terminal 26, wire 46, starting winding 30, and back to the other side of the source through wire 48. With the starting winding now in the circuit, it will be observed that the current in the starting winding, by flowing through the aforesaid portion of relay coil 16, assists in holding the bridging member provided by armature 10 in the contact closing position. As the motor increases its speed, the current in the main winding and thus in coil 16, decreases until such value is reached that the electromagnetic field of coil 16 is no longer able to hold the bridging member provided by armature 10 in the contact closing position. At that point this bridging member moves downward to open the relay contacts and thus disconnect the starting winding 30 from the power source.

If the aforesaid turns which lie between tapped turn 22 and the end 18 of the coil were not in the circuit, the value of the current at which this bridging member disconnects the contacts would be higher than is the case here, because the effect of the current flow through the aforesaid turns to the starting winding is to aid in tending to maintain this bridging member in the contact-closing position. Thus, the drop-out current of the system as shown is lower than would be the case were no such tapped turn and connection provided.

Of course, the ratio of a number of turns between end connection 18 and tapped turn 22, to the total number of turns provided by coil 16 varies according to the particular installation. In one installation, it was found that optimum results were obtained when the number of turns from end connection 18 to tapped turn 22 was approximately 25% of the total number of turns provided by the coil. (For this installation the motor used was a Siemens two-pole motor having both starting and main windings wound in a total of only eight stator slots.)

By providing a series of tapped turns on relay coil 16, the value of the drop-out current for the system can be altered to meet that required for different applications.

It has been found that by providing this relay and this system, the aforementioned difficulty of intermittent opening and closing of the contacts because of any peculiar relationship that exists between the characteristics of the relay coil and those of the motor, is eliminated.

It is obvious that member 10, along with contacts 6, 8, 12 and 14, forms a double break switch which could be altered to form a single break switch without materially affecting the circuitry as shown in the drawing simply by pivotally and electrically connecting member 10 at contact 8, for example, as is often the case in conventional relays, thus leaving contacts 6 and 12 free to operate to make and break the starting winding circuit under the influence of coil 16.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense.

I claim:

1. In combination: an electric motor including a starting winding and a main winding; an electromagnetic relay including a switch and a coil dominating said switch; said coil including a first portion and a second portion connected in mutually aiding, series circuit relation with each other; said windings being electrically connected in parallel circuit relation with each other; said first portion of said coil providing electrical connecting means for the flow of current through each of said windings; said coil, when said switch is both open and closed, being electrically connected in series with said main winding; and said first portion of the coil, when said switch is closed only, being electrically connected in series with said starting winding.

2. In combination: an electric motor including a starting winding and a main winding; an electromagnetic relay including a switch and a coil dominating said switch; said coil comprising two portions connected in mutually aiding, series circuit relation with each other; said windings being electrically connected in parallel circuit relation with each other; said windings and said relay being electrically connected to establish a first electrical current flow path for electrically energizing said main winding and to establish a second electrical current flow path for electrically energizing said starting winding; said first current flow path leading through said main winding and through said coil; said second current flow path, when said switch is closed, leading through said starting winding, through said switch and through only one of said portions of the coil.

References Cited in the file of this patent

UNITED STATES PATENTS

| 2,262,417 | Wolfert | Nov. 11, 1941 |
| 2,459,615 | Buchanan | Jan. 18, 1949 |

FOREIGN PATENTS

| 631,696 | Great Britain | Nov. 8, 1949 |